(12) United States Patent
Moon (10) Patent No.: US 11,511,734 B2
(45) Date of Patent: Nov. 29, 2022

(54) APPARATUS AND METHOD FOR CONTROLLING VEHICLE DRIVING

(71) Applicants: Hyundai Motor Company, Seoul (KR); Kia Motors Corporation, Seoul (KR)

(72) Inventor: Byoung Youp Moon, Gwangju (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 276 days.

(21) Appl. No.: 16/800,713

(22) Filed: Feb. 25, 2020

(65) Prior Publication Data

US 2021/0122365 A1 Apr. 29, 2021

(30) Foreign Application Priority Data

Oct. 23, 2019 (KR) .......................... 10-2019-0132414

(51) Int. Cl.
| | |
|---|---|
| *B60W 30/09* | (2012.01) |
| *B60W 30/095* | (2012.01) |
| *B60W 10/20* | (2006.01) |
| *B60W 10/30* | (2006.01) |
| *G08G 1/16* | (2006.01) |
| *B60W 50/00* | (2006.01) |

(52) U.S. Cl.
CPC ............ *B60W 30/09* (2013.01); *B60W 10/20* (2013.01); *B60W 10/30* (2013.01); *B60W 30/0953* (2013.01); *B60W 30/0956* (2013.01); *B60W 2050/0075* (2013.01); *B60W 2540/18* (2013.01); *B60W 2552/30* (2020.02); *B60W 2554/802* (2020.02); *B60W 2556/65* (2020.02); *B60W 2720/106* (2013.01); *G08G 1/161* (2013.01)

(58) Field of Classification Search
CPC ...... B60W 10/20; B60W 10/30; B60W 30/09; B60W 30/0953; B60W 30/0956; B60W 2540/18; B60W 2552/30; B60W 2554/802; B60W 2556/65; B60W 2720/106; G08G 1/161
See application file for complete search history.

(56) References Cited

U.S. PATENT DOCUMENTS

| | | | | |
|---|---|---|---|---|
| 2006/0095195 A1* | 5/2006 | Nishimura | .......... | B60W 30/025 701/96 |
| 2013/0131925 A1* | 5/2013 | Isaji | ...................... | B60W 30/16 701/41 |
| 2015/0206433 A1* | 7/2015 | Kanai | .................. | G05D 1/0297 701/1 |
| 2015/0224987 A1* | 8/2015 | Tachibana | .............. | G08G 1/166 701/1 |
| 2019/0202473 A1* | 7/2019 | Kaji | ....... | B60W 10/18 |
| 2020/0039511 A1* | 2/2020 | Ohmura | ................ | B60W 40/06 |
| 2020/0339126 A1* | 10/2020 | Mielenz | .................... | B60Q 1/24 |

* cited by examiner

*Primary Examiner* — Anshul Sood
(74) *Attorney, Agent, or Firm* — Fox Rothschild LLP (57) ABSTRACT

An apparatus and a method for controlling vehicle driving are provided. The apparatus includes a sensor that detects a first steering angle and a lane of a first vehicle and senses a second vehicle traveling in an opposite lane. A communication device receives a second steering angle of the second vehicle and a controller determines whether the first steering angle and the second steering angle are changed. The controller determines which of the vehicles enters a curved road based on a determination result and operates the vehicle which does not enter the curved road to decelerate.

16 Claims, 11 Drawing Sheets

FIG. 11

APPARATUS AND METHOD FOR CONTROLLING VEHICLE DRIVING

CROSS-REFERENCE TO RELATED APPLICATION

This application claims the benefit of priority to Korean Patent Application No. 10-2019-0132414, filed on Oct. 23, 2019, the entire contents of which are incorporated herein by reference.

TECHNICAL YIELD

The present disclosure relates to an apparatus and a method for controlling vehicle driving, and more particularly, to an apparatus and a method for controlling vehicle driving to prevent a collision using vehicle-to-vehicle (V2V) communication.

BACKGROUND

When a large vehicle (e.g., freight vehicle, truck, etc.) turns on a curved road, the vehicle may drive out of a track width due to the length of the vehicle, which increases collision risk. Thus, a method for driving a vehicle by selecting a path by setting a vehicle height, a weight limitation, narrow road avoidance, U-turn avoidance, high pass toll gate guidance, and the like to be suitable for the property of a large vehicle through a navigation system has been developed. However, when a large vehicle is inevitably required to travel on a two-lane road, there is insufficient development of a technology capable of preventing a collision with a vehicle that is driving in an opposite lane.

SUMMARY

The present disclosure provides an apparatus and a method for controlling driving to prevent a collision using a V2V communication in response to predicting that a large vehicle will drive over a center line while being driven on a narrow curved road. The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling driving of a subject vehicle may include a sensor configured to detect a first steering angle and a lane and sense an oncoming vehicle traveling in an opposite lane, a communication device configured to receive a second steering angle of the oncoming vehicle, and a controller configured to determine whether the first steering angle and the second steering angle are changed, detect a vehicle which enters a curved road based on a determination result, and operate a vehicle which does not enter the curved mad to decelerate.

The controller may be configured to detect the vehicle which enters the curved road as a host or subject vehicle in response to determining that the first steering angle is changed and the second steering angle is not changed. The controller may be configured to detect the vehicle which enters the curved mad as the oncoming vehicle in response to determining that the second steering angle is changed and the first steering angle is not changed. The controller may be configured to calculate a distance from the oncoming vehicle and operate an emergency light to blink and decelerate the subject vehicle in response to determining whether the first steering angle or the second steering angle is changed.

The controller may be configured to stop the subject vehicle which does not enter the curved mad until the oncoming vehicle which enters the curved road passes the subject vehicle which does not enter the curved mad after decelerating the subject vehicle which does not enter the curved road. The controller may be configured to determine whether a subsequent driving vehicle (e.g., a third vehicle) exists in the opposite lane after the vehicle (e.g., a second or oncoming vehicle) which enters the curved mad passes the vehicle (e.g., the first or subject vehicle) which does not enter the curved road. The controller may be configured to stop a large vehicle (e.g., a truck vehicle) when the first vehicle which does not enter the curved mad is the large vehicle and the subsequent driving vehicle (e.g., the third vehicle) is a small vehicle (e.g., a passenger vehicle).

Further, the controller may be configured to stop a large vehicle to stop when the vehicle that does not enter the curved mad is a small vehicle and the subsequent driving vehicle is the large vehicle. The controller may be configured to release the stop of the vehicle which does not enter the curved path and operate the vehicle to travel normally in response to determining that no subsequent driving vehicles are present in the opposite lane. The communication device may be configured to receive the second steering angle of the oncoming vehicle by performing V2V communication.

According to an aspect of the present disclosure, a method of controlling driving may include detecting a first steering angle and a lane of a subject vehicle and sensing an oncoming vehicle traveling in an opposite lane, receiving a second steering angle of the oncoming vehicle, determining whether the first steering angle and the second steering angle are changed and determining that a vehicle is entering a curved mad based on a determination result, and decelerating a vehicle which is not entering the curved mad. The determining of the vehicle which enters the curved mad may include determining the vehicle which enters the curved road as a host vehicle in response to determining that the first steering angle is changed and the second steering angle is not changed.

The determining of the vehicle which enters the curved mad may include determining the vehicle which enters the curved mad as the oncoming vehicle in response to determining that the second steering angle is changed and the first steering angle is not changed. The method may further include, after determining the vehicle which enters the curved mad, calculating a distance from the oncoming vehicle, operating an emergency light of the host vehicle to blink, and decelerating the host vehicle.

The method may further include, after decelerating of the vehicle which does not enter the curved mad, stopping the vehicle which does not enter the curved road until the vehicle which enters the curved road passes the vehicle which does not enter the curved road. Additionally, the method may include determining whether a subsequent driving vehicle is present in the opposite lane after the vehicle which enters the curved mad passes the vehicle which does not enter the curved mad.

The method may further include stopping a large vehicle when the vehicle which does not enter the curved road is the large vehicle and the subsequent driving vehicle is a small vehicle after determining whether the subsequent driving vehicle is present in the opposite lane. The method may further include stopping a large vehicle when the vehicle that does not enter the curved road is a small vehicle and the subsequent driving vehicle is the large vehicle after determining whether the subsequent driving vehicle is present in the opposite lane.

The method may further include releasing the stop of the vehicle which does not enter the curved path and operating the vehicle to travel normally in response to determining that no subsequent driving vehicles are present in the opposite lane after determining whether the subsequent driving vehicle is present in the opposite lane. The receiving of the second steering angle of the oncoming vehicle may include receiving the second steering angle of the oncoming vehicle by performing V2V communication.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
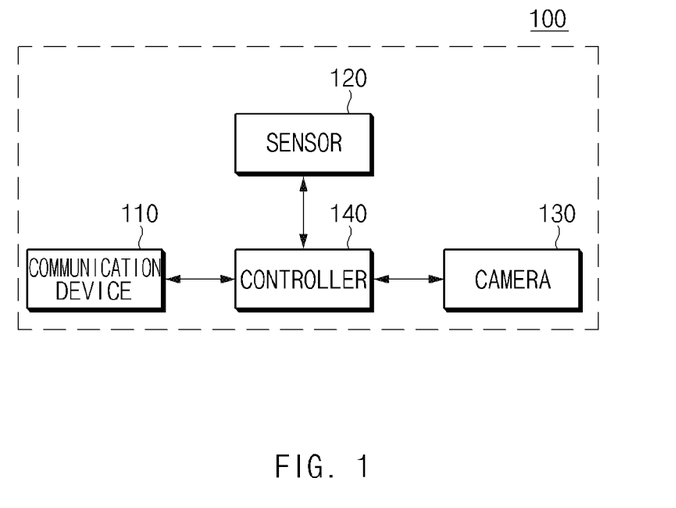
FIG. 1 is a view illustrating the configuration of a driving control apparatus according to an exemplary embodiment of the present disclosure.

FIG. 1 is a view illustrating the configuration of a driving control apparatus according to an exemplary embodiment of the present disclosure. As shown in FIG. 1, a driving control apparatus 100 may include a communication device 110, a sensor 120, a camera 130, and a controller 140. The communication device 110 may be configured to transmit or receive information to and from another vehicle (e.g., a second vehicle). In particular, the second vehicle may include a vehicle which is being driven near a host vehicle (e.g., subject or first vehicle) in a direction in which the host vehicle is being driven or may include a vehicle which is being driven in an opposite lane to the subject vehicle in a direction opposite to the direction in which the host vehicle is being driven. According to an exemplary embodiment, the communication device 110 may be configured to perform vehicle-to-vehicle (V2V) communication with another vehicle (e.g., the second vehicle) to receive steering angle information.

The V2V communication may be implemented through at least one of short-range communication, wired communication and wireless communication. The short-range communication may be performed through various short-range communication modules, such as Bluetooth, infrared communication, radio frequency identification (RFID) communication, wireless local access network (WLAN) communication, NFC communication, Zigbee communication, and the like, which transmit and receive signals using a wireless communication network in a local area.

Furthermore, the sensor 120 may be configured to sense a signal related to driving of a vehicle. For example, the sensor 120 may be configured to sense the speed of a vehicle and the steering angle of a steering wheel. Accordingly, the sensor 120 may include a wheel speed sensor and a steering wheel sensor. In addition, the sensor 120 may be configured to sense a lane of a road and sense another vehicle being driven in an opposite lane. Accordingly, the sensor 120 may include a radar or an image sensor.

The camera 130 or similar imaging device may be configured to obtain a front image by photographing the front of a vehicle while the vehicle is being driven. In particular, the camera 130 may be configured to obtain a shape of a road on which the vehicle is being driven and a lane image of the road. The controller 140 may be configured to determine whether the shape of the road is a curved road or a straight road based on the image obtained using the camera 130, and may be configured to determine the location of the current driving lane. In addition, the camera 130 may be configured to acquire an image of another vehicle driving in the opposite lane.

The controller 140 may be implemented with various processing devices such as a microprocessor in which a semiconductor chip is embedded, and the like configured or programmed to perform the operations or executions of various instructions, and execute the overall operation of the driving control apparatus according to an exemplary embodiment of the present disclosure. In particular, the controller 140 may be configured to obtain first steering angle information of the host or first vehicle, receive second steering angle information of the second vehicle from the second vehicle being driven in the opposite lane, determine whether first and second steering angles are changed, determine which of the vehicles enters a curved road based on the determination result, and operate the other of the vehicles which does not enter the curved road to decelerate. Since the steering angle changes when a vehicle enters the curved road, the controller 140 may be configured to determine the entry of the vehicle into the curved road based on the change in the steering angle and rapidly decelerate the vehicle when the steering angle change is substantial.

According to an exemplary embodiment, when the controller 140 determines that the first steering angle is changed and the second steering angle is remains unchanged, the controller 140 may be configured to determine that the host vehicle enters the curved road, the second vehicle does not enter the curved road. Meanwhile, in response to determining that the second steering angle is changed while the first steering angle remains unchanged, the controller 140 may be configured to determine that the second vehicle enters the curved road. The controller 140 may be configured to decelerate the second vehicle in response to determining that the host vehicle enters the curved road, and decelerate the host vehicle in response to determining that the second vehicle enters the curved road. In particular, it may be understood that the controller 140 is configured to decelerate the second vehicle by requesting the second vehicle to decelerate via V2V communication and the second vehicle may be configured to receive the request signal and adjust the speed thereof in response to the request signal.

The operation of the controller 140 related to the above will be described in detail with reference to FIGS. 2 to 9.

Figure 2:
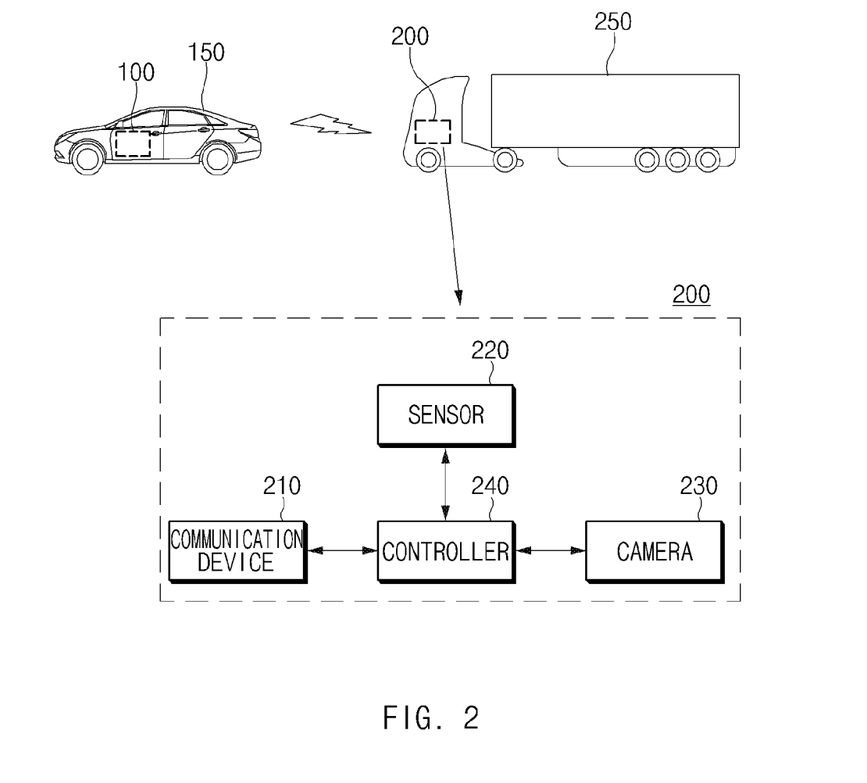
FIG. 2 is a view schematically illustrating the V2V communication of the driving control apparatus according to an exemplary embodiment of the present disclosure.

FIG. 2 is a view schematically illustrating the V2V communication of the driving control apparatus according to an exemplary embodiment of the present disclosure.

According to an exemplary embodiment, when a host vehicle 150 is a small vehicle (e.g., a passenger vehicle), the second vehicle 250 may include a large vehicle (e.g., a truck or freight vehicle). When the host vehicle 150 is a large vehicle, the second vehicle 250 may include a small vehicle. In particular, the small vehicle may refer to a vehicle that does not drive out the road width when being driven on a curved road, and the large vehicle may refer to a vehicle that drives out or beyond the road width when being driven on a curved road. According to an exemplary embodiment of the present disclosure, the driving control apparatuses provided in the host vehicle and the second vehicle are the same, but for convenience of explanation of the V2V communication, the driving control apparatus provided in the host vehicle 150 is denoted by reference numeral '100' and the driving control apparatus provided in the second vehicle 250 is denoted by reference numeral '200'. In addition, a communication device 210, a sensor 220, a camera 230, and a controller 240 included in the driving control device 200 may be operated in the same manner as the communication device 110, the sensor 120, the camera 130 and the controller 140 included in the driving control apparatus 100.

Figure 3:
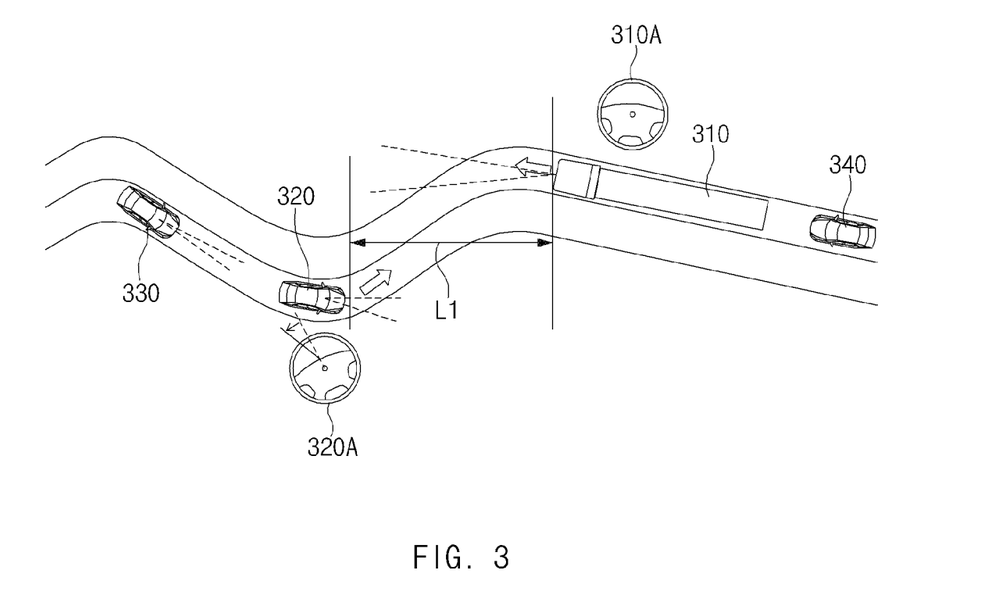
FIGS. 3 to 7 are views illustrating the operation of a driving control apparatus according to an exemplary embodiment of the present disclosure.

FIGS. 3 to 7 are views illustrating the operation of a driving control apparatus according to an exemplary embodiment of the present disclosure. As shown in FIG. 3, when a host vehicle 310 is a large vehicle, the controller 140 may be configured to receive a steering angle from a second vehicle 320 via V2V communication. When the controller 140 determines that the steering angle is changed from the second vehicle 320 as denoted by reference numeral 320A, the controller 140 may be configured to determine that the second vehicle 320 has entered a curved road. In addition, the controller 140 may be configured to calculate a distance L1 between the host vehicle 310 and the second vehicle 320.

Figure 4:
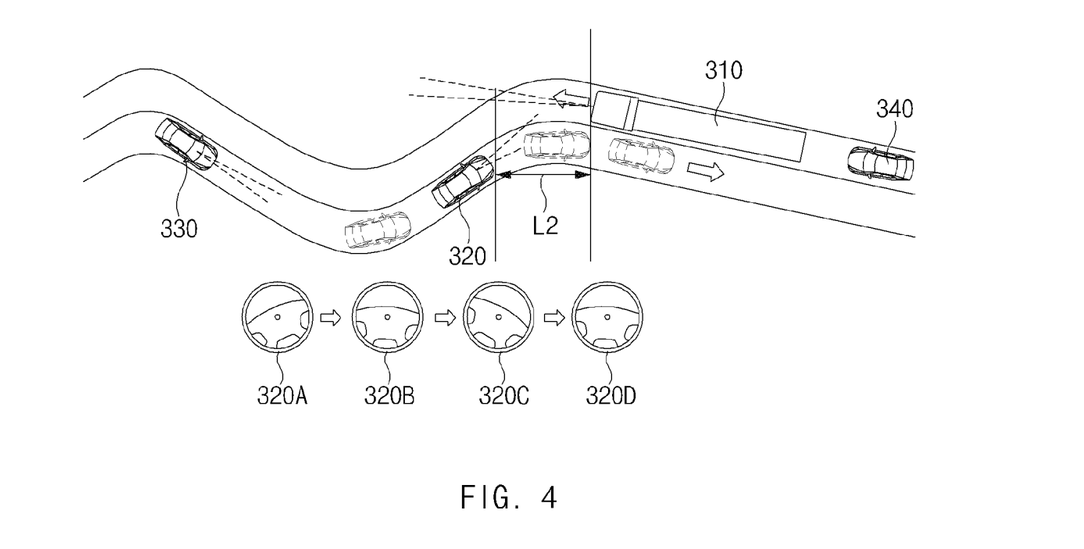

As shown in FIG. 4, when the controller 140 determines that the distance L1 a L2 between the host vehicle 310 and the second vehicle 320 is reduced, the controller 140 may be configured to operate the host vehicle 310 to decelerate and operate an emergency light to blink to provide a notification to a subsequent driving vehicle 340 of the host vehicle 310 (e.g., a third vehicle 340 being driven behind the host vehicle) that the host vehicle 310 is decelerating and to warn the third vehicle 340 to maintain an inter-vehicle distance. Thereafter, the controller 140 may be configured to operate the host vehicle 310 to stop. In addition, the controller 140 may be configured to determine a change in the steering angle of the second vehicle 320 in the sequence of 320A, 320B, 320C, and 320D and that the distance between the second vehicle 320 and the host vehicle 310 is further reduced.

The controller 140 may be configured to determine whether the second vehicle 320 passes the stopped host vehicle 310. In particular, when the controller 140 determines that the second vehicle 320 does not pass the host vehicle 310, the controller 140 may be configured to stop the host vehicle 310 until the second vehicle 320 passes the host vehicle 310. In addition, when the controller 140 determines that the second vehicle 320 has passed the host vehicle 310, the controller 140 may be configured to release the blinking of the emergency light of the host vehicle 310.

Figure 5:
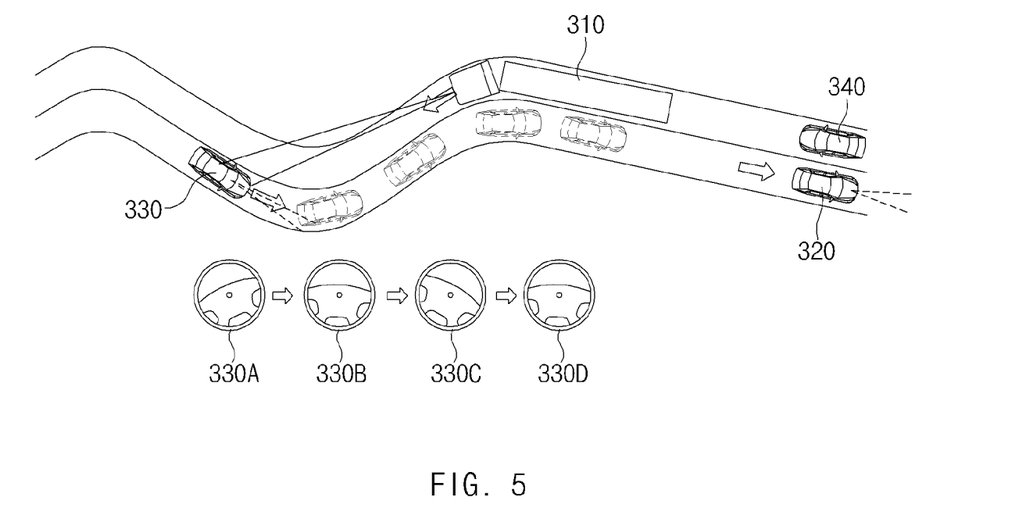

As shown in FIG. 5, the controller 140 may be configured to determine whether a subsequent driving vehicle is present in the opposite lane after the second vehicle 320 (e.g., a fourth vehicle being driven behind the second vehicle) passes the host vehicle 310. When the controller 140 determines that a subsequent driving vehicle 330 (e.g., a fourth vehicle) is present in the opposite lane, the controller 140 may be configured to operate the host vehicle 310 to decelerate and operate the emergency light to blink to notify the subsequent driving vehicle 340 of the host vehicle 310 (e.g., the third vehicle being driven behind the host vehicle) that the host vehicle 310 is decelerating and to warn the third vehicle to maintain an inter-vehicle distance. Thereafter, the controller 140 may be configured to stop the host vehicle 310. In addition, the controller 140 may be configured to determine that the steering angle of the second vehicle 320 is changed in the sequence of 330A, 330B, 330C, and 330D, and that the distance between the second vehicle 320 and the host vehicle 310 is further reduced.

The controller 140 may be configured to determine whether the second vehicle 330 has passed the stopped host vehicle 310. In particular, when the controller 140 determines that the second vehicle 330 does not pass the host vehicle 310, the controller 140 may be configured to operate the host vehicle 310 to stop until the second vehicle 330 passes the host vehicle 310. In addition, when the controller 140 determines that the second vehicle 330 has passed the host vehicle 310, the controller 140 may be configured to release the blinking of the emergency light of the host vehicle 310. Meanwhile, when the controller 140 determines that there is no subsequent driving vehicle in the opposite lane (e.g., no vehicle being driven behind the second vehicle), the controller 140 may be configured to operate the vehicle to release the stop state and to operate in a normal state.

Figure 6:
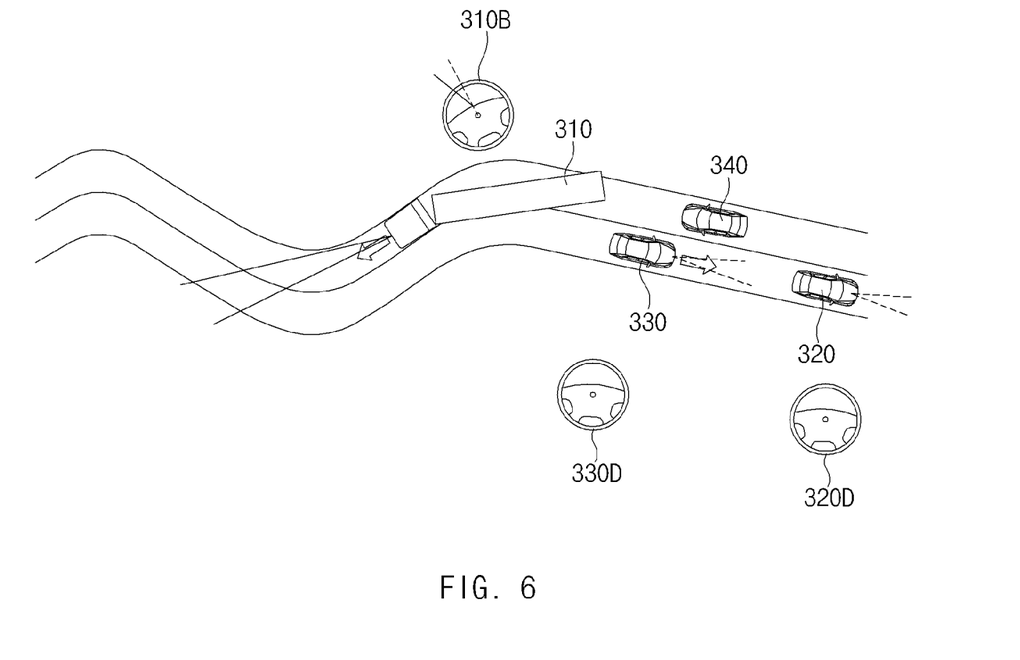
Figure 7:
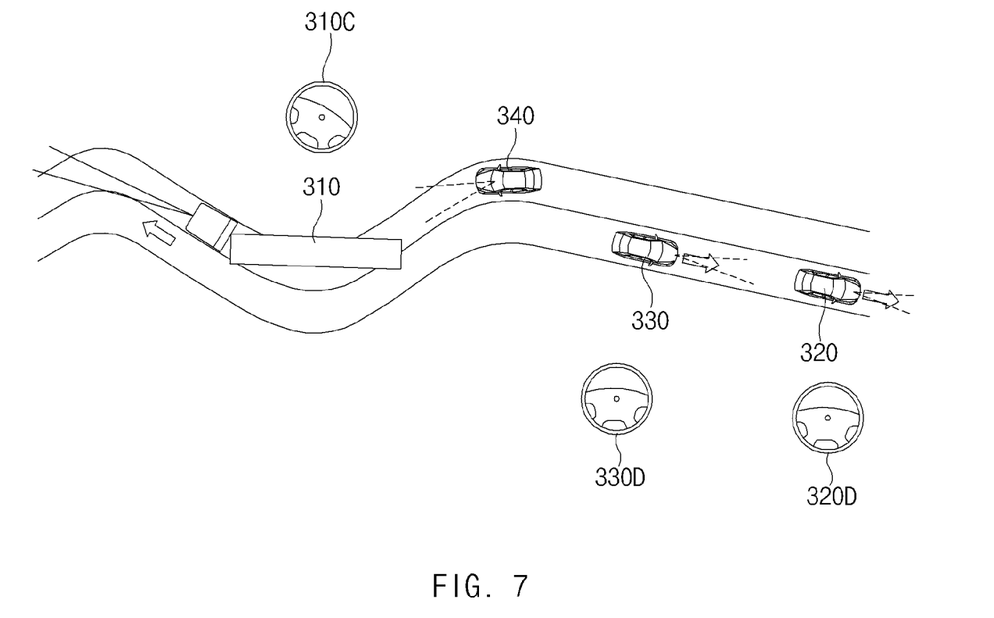
Figure 8:
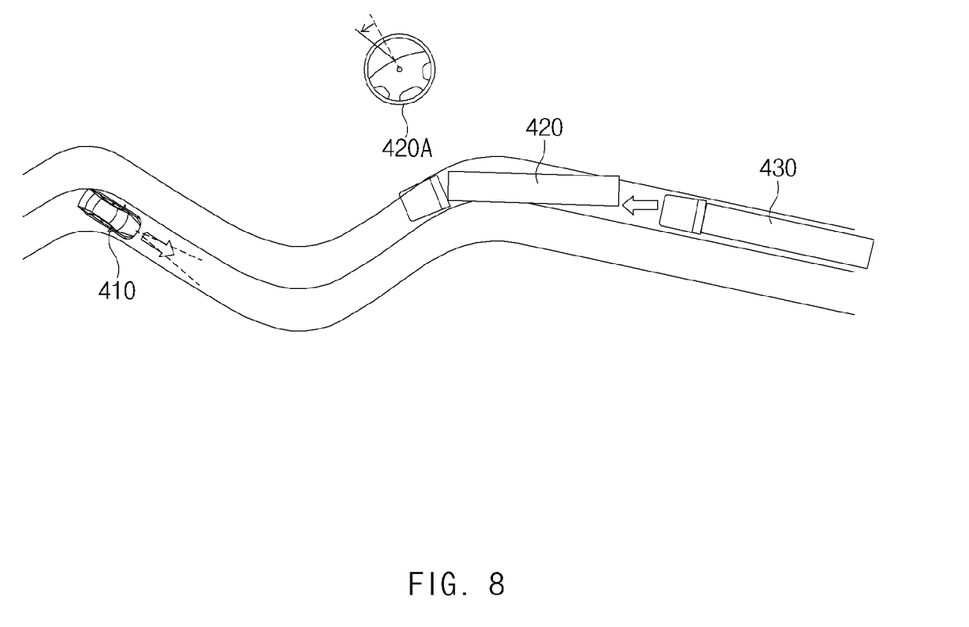
FIGS. 8 and 9 are views illustrating the operation of a driving control apparatus according to another exemplary embodiment of the present disclosure.
Figure 9:
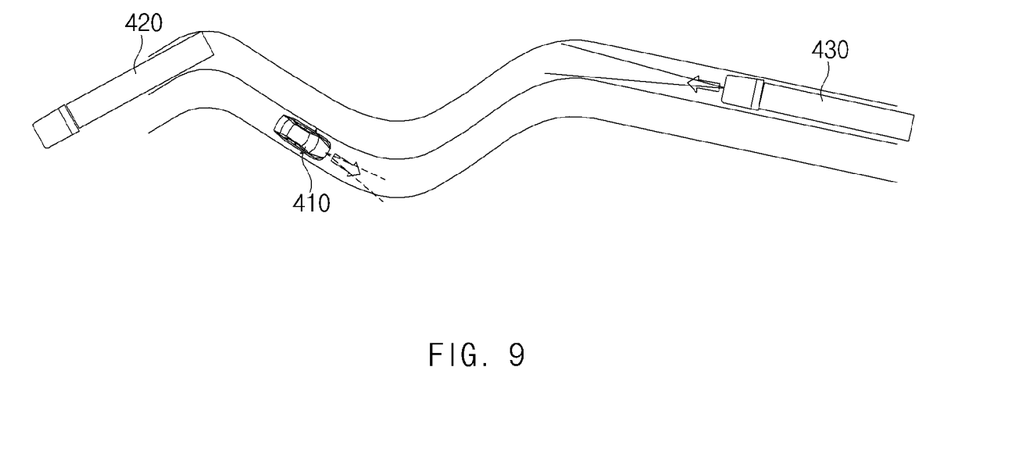

As shown in FIGS. 6 and 7, when the host vehicle 310 is being driven in a normal state, the controller 140 may be configured to adjust the steering angle to be changed to 310B and 310C to travel in the curved road. FIGS. 8 and 9 are views illustrating the operation of a driving control apparatus according to another exemplary embodiment of the present disclosure.

As shown in FIG. 8, when a host vehicle 410 is a small vehicle (e.g., a passenger vehicle), the controller 140 may be configured to receive a steering angle from a second vehicle 420 via V2V communication. When the controller 140 detects a change in the steering angle as indicated by reference numeral 420A from the second vehicle 420, the controller 140 may be configured to determine that the second vehicle 420 enters a curved mad. In addition, the controller 140 may be configured to calculate a distance between the host vehicle 410 and the second vehicle 420.

When the controller 140 determines that the distance between the host vehicle 410 and the second vehicle 420 is gradually decreased, the controller 140 may be configured to operate the host vehicle 410 to decelerate and operate the emergency light to blink to warn a subsequent driving vehicle (not shown) of the host vehicle 410 that the host vehicle 410 is decelerating and to maintain an inter-vehicle distance. Thereafter, the controller 140 may be configured to operate the host vehicle 410 to stop. In addition, the controller 140 may be configured to determine that the steering angle of the second vehicle 420 changes as the vehicle driven on a curved mad, and the distance between the second vehicle 420 and the host vehicle 410 is further reduced.

The controller 140 may further be configured to determine whether the second vehicle 420 has passed the stopped host vehicle 410. In particular, when the controller 140 determines that the second vehicle 420 does not pass the host vehicle 410, the controller 140 may be configured to operate the host vehicle 410 to stop until the second vehicle 420 passes the host vehicle 410. In addition, when the controller 140 determines that the second vehicle 420 has passed the host vehicle 410, the controller 140 may be configured to operate the host vehicle 410 to release the blinking of the emergency light.

As shown in FIG. 9, after the second vehicle 420 passes the host vehicle 410, the controller 140 may be configured to determine whether a subsequent driving vehicle 430 of the second vehicle 420 (e.g., a third vehicle being driven behind the second vehicle) is present in the opposite lane to the host vehicle 410. In response to determining that a subsequent driving vehicle 430 is present in the opposite lane and the subsequent driving vehicle 430 is a large vehicle (e.g., a truck or freight vehicle), the controller 140 may be configured to request the subsequent driving vehicle 430 via V2V communication to decelerate. Hereinafter, to distinguish from the operation of the controller 140 of the host vehicle 410, the control operation of the subsequent driving vehicle 430 will be described as the operation of the controller 240.

When the controller 240 of the driving control apparatus 200 provided in the subsequent driving vehicle 430 (e.g., the third vehicle) is requested to decelerate to reduce the traveling speed compared to the speed from the host vehicle 410, the controller 240 may be configured to operate the subsequent driving vehicle 430 to decelerate and operate the emergency light to blink. Thereafter, the controller 240 may be configured to operate the subsequent driving vehicle 430 to stop. In addition, the controller 240 may be configured to determine that the steering angle of the host vehicle 410 is changing as the host vehicle 410 is being driven on a curved road and the distance between the host vehicle 410 and the subsequent driving vehicle 430 further decreases. The controller 240 may be configured to determine whether the host vehicle 410 has passed the stopped subsequent driving vehicle 430.

In particular, when the controller 240 may be configured to determine that the host vehicle 410 does not pass the subsequent driving vehicle 430, the controller 240 may be configured to operate the subsequent driving vehicle 430 to stop until the host vehicle 410 passes the subsequent driving vehicle 430. In addition, when the controller 240 determines that the host vehicle 410 has passed the subsequent driving vehicle 430, the controller 240 may be configured to operate the subsequent driving vehicle 430 to release the blinking of the emergency light of the subsequent driving vehicle 430.

Figure 10:
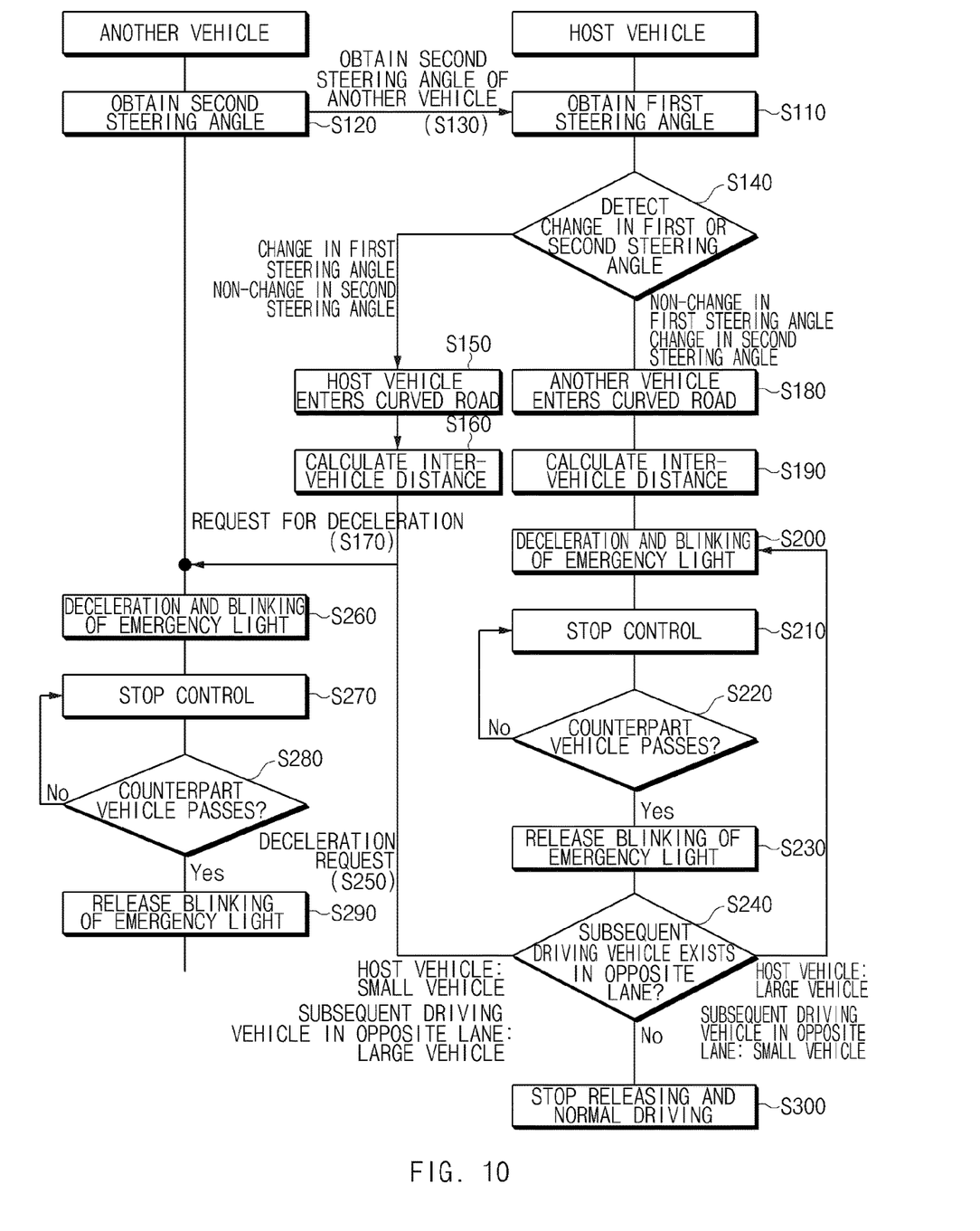
FIG. 10 is a flowchart illustrating a driving control method according to an exemplary embodiment of the present disclosure.

FIG. 10 is a flowchart illustrating a driving control method according to an exemplary embodiment of the present disclosure. As illustrated in FIG. 10, in operation S110, the controller 140 may be configured to obtain a first steering angle of a first vehicle from the sensor 120. In addition, in operation S130, the controller 140 may be configured to receive a second steering angle obtained from the sensor 220 of a second vehicle in operation S120 from the second vehicle. In operation S130, the controller 140 may be configured to receive the second steering angle from the second vehicle via V2V communication. In addition, in operation S140, the controller 140 may be configured to determine whether a change is detected in the first steering angle or the second steering angle.

When the controller 140 determines in operation S140 that the first steering angle is changed and the second steering angle remains unchanged, in operation S150, the controller 140 may be configured to determine that the host or first vehicle enters a curved road. In addition, the controller 140 may be configured to calculate the distance between the host vehicle and the second vehicle in operation S160, and request the second vehicle to decelerate in operation S170. In operation S170, the controller 140 may be configured to request a deceleration from the second vehicle via the V2V communication. Meanwhile, when the controller 140 determines in operation S140 that the first steering angle remains unchanged and the second steering angle is changed, in operation S180, the controller 140 may be configured to determine that the second vehicle has entered the curved road. In addition, the controller 140 may be configured to calculate the distance between the host vehicle and the second vehicle in operation S190, and operate the host vehicle to decelerate and the emergency light to blink in operation S200.

Thereafter, the controller 140 may be configured to operate the host vehicle to stop in operation S210. In addition, the controller 140 may be configured to determine that the steering angle of the second vehicle changes as the second vehicle travels on a curved road, and the distance between the second vehicle and the host vehicle is further reduced. In operation S220, the controller 140 may be configured to determine whether the second vehicle (the vehicle being driven in an opposite lane to the host vehicle) has passed the stopped host vehicle. When the controller 140 determines in operation S220 that the second vehicle has not passed the host vehicle (N), in operation S210, the controller 140 may be configured to stop the host vehicle until the second vehicle passes the host vehicle. In addition, in response to determining in operation S220 that the second vehicle has passed the host vehicle, in operation S230, the controller 140 may be configured to operate the host vehicle to release the blinking of the emergency light.

After the second vehicle passes the host vehicle, in operation S240, the controller 140 may be configured to determine whether a subsequent driving vehicle (e.g., a third vehicle) is present in the opposite lane to the host vehicle. In operation S240, the controller 140 may be configured to determine that a subsequent driving vehicle is present in the opposite lane, but when the host vehicle is a large vehicle and the subsequent driving vehicle is a small vehicle in the opposite lane, the controller 140 may perform operations S200 to S230. In addition, the controller 140 may be configured to determine in operation S240 that there is a subsequent driving vehicle in the opposite lane, but when the host vehicle is a small vehicle and the subsequent driving vehicle is a large vehicle in the opposite lane, in operation S250, the controller 140 may be configured to request the second vehicle to decelerate. In operation S250, the controller 140 may be configured to request the second vehicle to decelerate via the V2V communication.

Meanwhile, when there is no subsequent driving vehicle in the opposite lane, in operation S300, the controller 140 may be configured to operate the host vehicle to release the stop and drive normally. When the controller 240 of the second vehicle is requested to decelerate from the host vehicle, in operation S260, the second vehicle may be operated to decelerate and the emergency light may be operated to blink. Thereafter, the controller 140 may be configured to stop the second vehicle in operation S270. In addition, the controller 140 may be configured to determine that the steering angle of the second vehicle changes as the second vehicle travels on a curved road, and the distance between the second vehicle and the host vehicle is further reduced. In operation S280, the controller 240 may be configured to determine whether the host vehicle has passed the stopped second vehicle.

When the controller 240 determines in operation S280 that the host vehicle does not pass the second vehicle (N), in operation S270, the controller 240 may be configured to operate the second vehicle to stop until the second vehicle passes the host vehicle. In addition, in response to determining in operation S280 that the host vehicle has passed the second vehicle, in operation S290, the controller 240 may be configured to operate the second vehicle to release the blinking of the emergency light.

Figure 11:
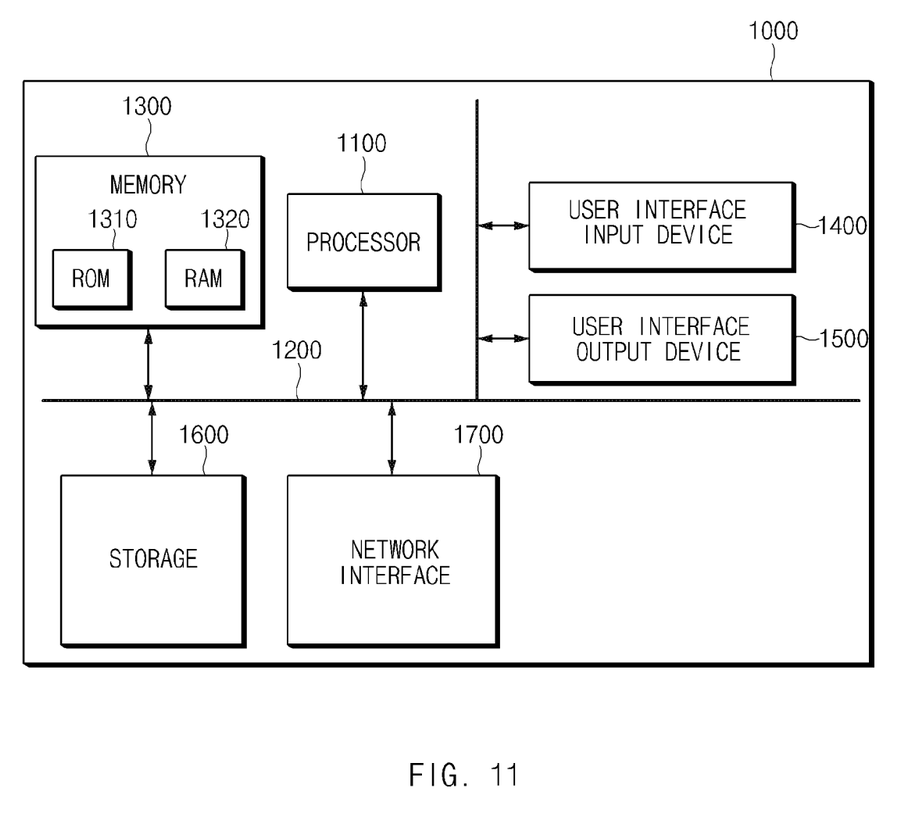
FIG. 11 is a view illustrating a computing system that executes a method according to an exemplary embodiment of the present disclosure.

FIG. 11 is a view illustrating a computing system that executes a method according to an exemplary embodiment of the present disclosure. Referring to FIG. 11, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320. Thus, the operations of the method or the algorithm described in connection with the exemplary embodiments disclosed herein may be embodied directly in hardware or a software module executed by the processor 1100, or in a combination thereof.

The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to the exemplary embodiments of the present disclosure, there are provided an apparatus and a method for controlling driving that allow a vehicle to drive safely without colliding with a vehicle travelling in an opposite lane even when a large vehicle drives in a narrow curved road.

The above description is a simple exemplification of the technical spirit of the present disclosure, and the present disclosure may be variously corrected and modified by those skilled in the art to which the present disclosure pertains without departing from the essential features of the present disclosure. Therefore, the disclosed exemplary embodiments of the present disclosure do not limit the technical spirit of the present disclosure but are illustrative, and the scope of the technical spirit of the present disclosure is not limited by the exemplary embodiments of the present disclosure. The scope of the present disclosure should be construed by the claims, and it will be understood that all the technical spirits within the equivalent range fall within the scope of the present disclosure.

What is claimed is:

1. An apparatus for controlling vehicle driving, comprising:
   a sensor configured to detect a first steering angle and a lane of a first vehicle and sense a second vehicle traveling in an opposite lane, wherein the first steering angle is detected when the first vehicle drives in a straight road;
   a communication device configured to receive a second steering angle of the second vehicle, wherein the second steering angle is detected when the second vehicle drives in the straight road; and
   a controller configured to:
      determine whether the first steering angle and the second steering angle are changed as the first vehicle and the second vehicle enter a curve road from the straight road,
      determine which of the first vehicle and the second vehicle enters the curved road based on a determination result, and
      decelerate the first vehicle or the second vehicle determined to not enter the curved road;
   wherein the controller is further configured to:
      determine the first vehicle as entering the curved road in response to determining that the first steering angle is changed and the second steering angle remains unchanged; and
      determine the second vehicle as entering the curved road in response to determining that the second steering angle is changed and the first steering angle remains unchanged.

2. The apparatus of claim 1, wherein the controller is configured to calculate a distance from the second vehicle to the first vehicle and operate an emergency light to blink and the first vehicle to decelerate in response to determining whether the first steering angle or the second steering angle is changed.

3. The apparatus of claim 1, wherein the controller is configured to stop the first vehicle or the second vehicle determined not to enter the curved road until the first vehicle or the second vehicle determined to enter the curved road passes after decelerating the first vehicle or second vehicle determined not to enter the curved road.

4. The apparatus of claim 3, wherein the controller is configured to determine whether a third vehicle is present in the opposite lane after the first vehicle or the second vehicle determined to enter the curved road passes the first vehicle or the second vehicle determined to not enter the curved road.

5. The apparatus of claim 4, wherein the controller is configured to stop a freight vehicle when the first vehicle or the second vehicle determined to not enter the curved road is the freight vehicle and the third vehicle is a passenger vehicle.

6. The apparatus of claim 4, wherein the controller is configured to stop a freight vehicle when the first vehicle or the second vehicle determined to not enter the curved road is a passenger vehicle and the third vehicle is the freight vehicle.

7. The apparatus of claim 4, wherein the controller is configured to release the stop of the first vehicle or the second vehicle determined to not enter the curved road in response to determining that no subsequent driving vehicles are present in the opposite lane.

8. The apparatus of claim 1, wherein the communication device is configured to receive the second steering angle of the second vehicle by performing vehicle to vehicle (V2V) communication.

9. A method of controlling vehicle driving, comprising:
   detecting, by a controller, a first steering angle and a lane of a first vehicle, and sensing a second vehicle traveling in an opposite lane to the first vehicle, wherein the first steering angle is detected when the first vehicle drives in a straight road;
   receiving, by the controller, a second steering angle of the second vehicle, wherein the second steering angle is detected when the second vehicle drives in the straight road;
   determining, by the controller, whether the first steering angle and the second steering angle are changed as the first vehicle and the second vehicle enter a curve road from the straight road, and determining which of the first vehicle and the second vehicle enters a curved road based on a determination result; and
   decelerating, by the controller, the first vehicle or the second vehicle determined to not enter the curved road;
   wherein the determining of which of the first vehicle and the second vehicle enters the curved road includes:
      determining, by the controller, the first vehicle as entering the curved road in response to determining that the first steering angle is changed and the second steering angle remains unchanged, and
      determining, by the controller, the second vehicle as entering the curved road in response to determining that the second steering angle is changed and the first steering angle remains unchanged.

10. The method of claim 9, further comprising:
    after determining which of the first vehicle and the second vehicle enters the curved road, calculating, by the controller, a distance from the second vehicle to the first vehicle;
    operating, by the controller, an emergency light of the first vehicle to blink; and
    decelerating, by the controller, the first vehicle.

11. The method of claim 9, further comprising:
    after decelerating the first vehicle or the second vehicle determined not to enter the curved road, stopping, by the controller, the first vehicle or the second vehicle determined not to enter the curved road until the first vehicle or the second vehicle determined to enter the curved road passes.

12. The method of claim 11, further comprising:
    determining, by the controller, whether a subsequent driving vehicle is present in the opposite lane after the first vehicle or the second vehicle determined to enter the curved road passes the first vehicle or the second vehicle determined not to enter the curved road.

13. The method of claim 12, further comprising:
    stopping, by the controller, a freight vehicle when the first vehicle or the second vehicle determined to not enter the curved road is the freight vehicle and the subsequent driving vehicle is a passenger vehicle after determining whether the subsequent driving vehicle is present in the opposite lane.

14. The method of claim 12, further comprising:
    stopping, by the controller, a freight vehicle when the first vehicle or the second vehicle determined to not enter the curved road is a passenger vehicle and the subsequent driving vehicle is the freight vehicle after determining whether the subsequent driving vehicle is present in the opposite lane.

15. The method of claim 12, further comprising:
   releasing, by the controller, the stop of the first vehicle or the second vehicle determined to not enter the curved path in response to determining that any subsequent driving vehicles are not present in the opposite lane.

16. The method of claim 9, wherein the receiving of the second steering angle of the second vehicle includes:
   receiving, by the controller, the second steering angle of the second vehicle by performing vehicle to vehicle (V2V) communication.

* * * * *